United States Patent Office 3,482,663
Patented Dec. 9, 1969

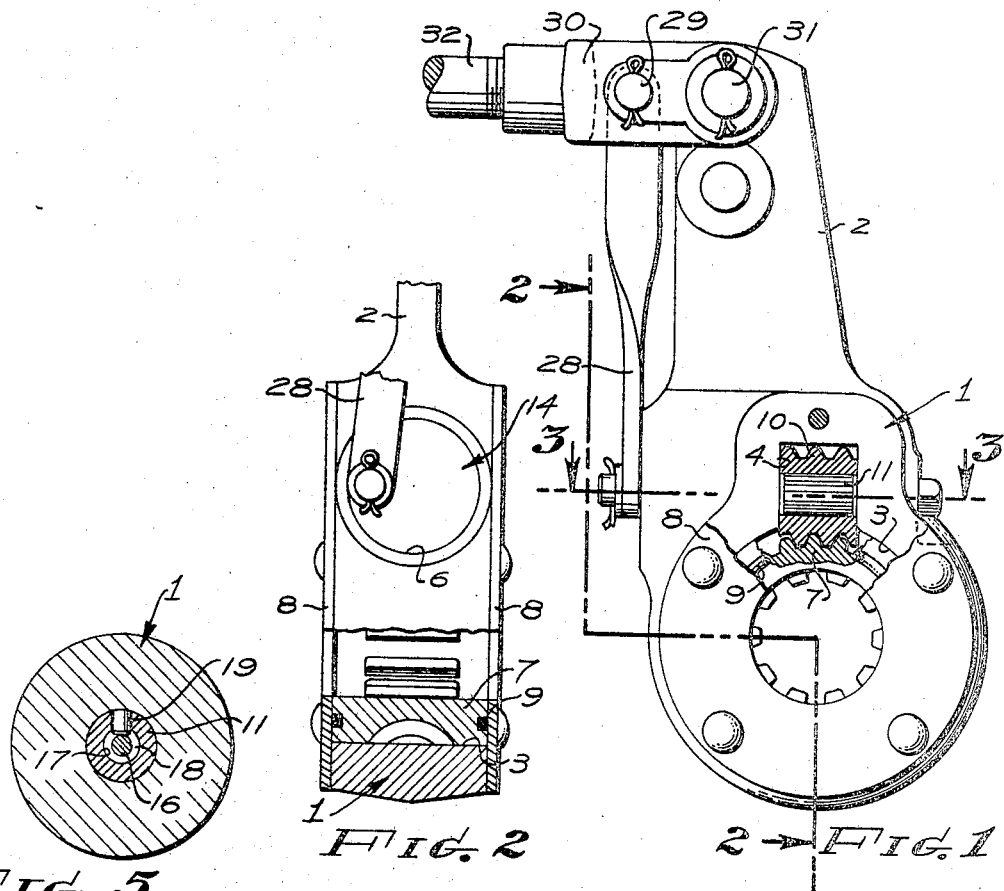
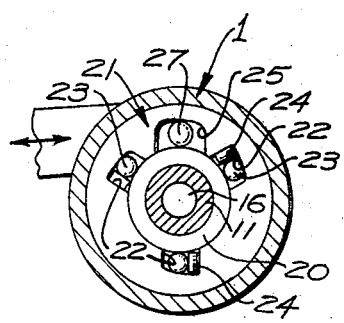
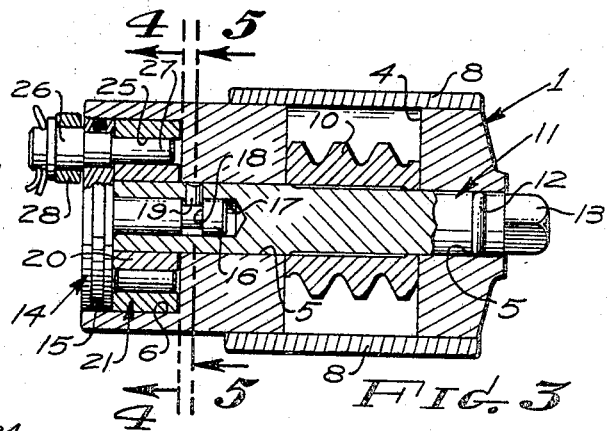

3,482,663
AUTOMATIC BRAKE SLACK ADJUSTER
Donald T. McGregor, La Crescenta, and Carl L. Lodjic, Long Beach, Calif., assignors to Autoset Corporation, Torrance, Calif., a corporation of California
Filed Feb. 1, 1968, Ser. No. 702,274
Int. Cl. F16d 65/56
U.S. Cl. 188—196                    7 Claims

ABSTRACT OF THE DISCLOSURE

A brake adjuster contained in a housing and lever arm interposed between a brake operating shaft and an actuating rod and containing a worm and worm-gear unit connected through an overriding clutch operated through a lost-motion linkage by a crankpin which is linked to the actuating rod. The clutch and crankpin are capable of assembly so that the actuator may be located on the right or left side of a vehicle. Also, the clutch and lost-motion connection are such that adjustment is made upon minimal wear of the brake lining so that the brake pedal or brake applicator movement remains essentially constant.

BACKGROUND OF THE INVENTION

The following patents and applications pertaining to automatic brake adjusters share common ownership:
3,314,508—McGregor, D. T., et al.
3,301,354—McGregor, D. T.
3,177,983—McGregor, D. T.
2,835,354—MacDougall, K. B.
2,752,009—MacDougall, K. B.
2,743,793—MacDougall, K. B.
2,648,996—MacDougall, K. B.
2,481,319—MacDougall, K. B.

Appln. Ser. No. 623,504, filed Mar. 9, 1967—Lodjic, C. J., et al.
Appln. Ser. No. 677,182, filed Oct. 23, 1967—Lodjic, C. J., et al.

All of these patents seek to provide automatic brake adjustment and all succeed, at least to some extent. In some cases, the adjustment increment is too large so that the brake pedal or the air brake applicator movement varies substantially. This has been overcome in some instances by providing tandem arranged worm and worm gear units which respond to minimal wear; however, the number and cost of parts are naturally increased. The problems of installation and maintenance have been such that continuous successful operation has depended too much on the skill of the servicemen. At the time of installation, or when the brake lining is replaced, readjustment of the adjuster has been too complicated.

SUMMARY OF THE INVENTION

The present invention seeks to overcome the disadvantages found in previous automatic brake adjusters such as the types shown in the above identified patents and applications, and accordingly, the objects of this invention are:

First, to provide an automatic brake adjuster which incorporates a novelly arranged overriding clutch and lost motion connection which accomplishes fine adjustment of the brake without the need of tandem worm and worm gear units, a single worm gear unit being sufficient.

Second, to provide an automatic brake adjuster which may be readily reset, when the brake linings are replaced, without disassembly, merely by turning an exposed resetting member.

Third, to provide an automatic brake adjuster of the type indicated in the other objects which is readily assembled without substitution of parts to operate a brake at the right or left side of a vehicle.

DESCRIPTION OF FIGURES

FIGURE 1 is a side view of the automatic brake slack adjuster.
FIGURE 2 is a partial sectional, partial end view thereof, taken through 2—2 of FIGURE 1.
FIGURE 3 is an enlarged sectional view, taken through 3—3 of FIGURE 1.
FIGURE 4 is a transverse sectional view, taken through 4—4 of FIGURE 3.
FIGURE 5 is a fragmentary transverse sectional view, taken through 5—5 of FIGURE 3.
FIGURE 6 is a perspective view of the clutch roller backup spring.

SPECIFICATION

The automatic slack adjuster includes a body 1, from which extends a lever arm 2, and forming therewith a lever structure. The body includes a hub portion which defines a worm gear chamber 3, intersected at the side from which the lever arm extends by a worm slot 4. The worm slot is penetrated by a worm shaft bore 5, enlarged at one end to form a counterbore or chamber 6.

The worm gear chamber 3 receives a worm gear 7, which is internally splined for connection to a conventional brake operating shaft, not shown. The worm gear chamber 3 and the worm slot 4 are provided with cover plates 8, apertured to receive the brake operating shaft. Seal rings 9 underly the cover plates.

The worm slot 4 receives a worm 10, suitably secured to a worm shaft 11, one end of which extends into the counterbore 6 and the other end of which protrudes from the body 1. A seal ring 12 is provided near the protruding end of the shaft and the protruding end is polygonal in cross section, as indicated by 13, so as to receive a tool to effect manual rotation of the shaft.

The counterbore 6 receives a cover disk 14, having a peripherial seal ring 15 and a stem 16. The stem extends into a socket 17 provided in the end of the worm shaft 11. Near its end, the stem 16 is provided with an annular groove 18 which receives a retainer pin 19 held in place by the confronting wall of the worm shaft bore 5.

Press fitted on the worm shaft 11, within the counterbore or chamber 6, is a bearing ring 20. The space between the bearing ring and the walls of the counterbore 6 receives an annular clutch holder 21, having a set of three clutch roller recesses 22 confronting the ring 20. The recesses 22 have walls which taper relative to the surface of the bearing ring. Each recess receives a clutch roller 23, backed by a spring 24.

The clutch holder 21 is also provided with a crank pin slot 25, and mounted on the disk 14 is a crank shaft 26 which penetrates the disk and is secured thereto. A clutch drive pin 27 continues from the crank shaft 26 and fits within the slot 25 for the purpose of turning the clutch holder 21. The slot 25 permits a predetermined amount of free movement of the drive pin 27 and the crank shaft 26, as well as corresponding rotation of the cove disk 14.

The crank shaft 26 is connected by a link 28 to a pivot pin 29 carried by a clevis 30, which in turn is joined by a pivot pin 31 to the lever arm 2. The clevis 30 is joined to an operating shaft 32.

Operation of the automatic brake slack adjuster is as follows:

When the vehicle brakes are first installed, and before wear has occurred, the clearance between the slot 25 and the drive pin 27 is such that no turning force is applied to the clutch holder 21. However, when slight wear occurs, the drive pin 27 engages an end of the slot 25 and turns the clutch holder 21 slightly. The clutch rollers 23 are held in tight contact with the holder 21 and the bearing ring 20 so that there need be no free play between the holder 21 and the worm shaft 11. As a result, the worm turns slightly, producing an even slighter rotation of the worm gear 7 and the brake operating shaft in a direction to compensate for the wear which has occurred. This movement occurs, of course, after all play has been taken up between the worm and worm gear and between the operating parts of the brake. Once the slack has been taken up, adjustment is essentially continuous and in proportion to wear.

It should be noted that by reversing the clutch holder 21, the operating direction may be clockwise or counter-clockwise so as to adapt the brake adjuster to a left side or right side brake without requiring any parts to be altered.

While it is preferred to place the clutch rollers 23 between the clutch holder and the operating shaft, it is possible to provide the recesses 22 at the outer periphery of the holder so as to co-act with the surrounding walls of the counterbore. In this case a bearing ring corresponding to the bearing ring 20 should line the counterbore and the holder is secured to the shaft 11.

Should manual adjustment be required, for example, when the brake lining is replaced, the adjuster may be turned manually by a wrench applied to protruding end 13 of the shaft 11.

While particular embodiments of this invention have been shown and described, it is not intended to limit the same to the details of the constructions set forth, but instead, the invention embraces such changes, modifications and equivalents of the various parts and their relationships.

We claim:
1. In an automatic slack adjuster for vehicle brakes wherein the adjuster is housed within a lever structure interposed between a brake shaft and an operating rod, and wherein the adjuster is provided with a worm and worm gear operatively connecting said operating rod and brake shaft, said slack adjuster comprising:
 (a) a shaft carrying said worm;
 (b) an overriding clutch mounted on said shaft and operable to turn said shaft thereby to drive said worm to change the angular position of said lever relative to said brake shaft and compensate for wear of said vehicle brake;
 (c) a crank shaft rotatably mounted in eccentric relation to said shaft;
 (d) means including a drive pin extending from said crank shaft into said clutch and a slot in said clutch to permit a predetermined amount of free movement of said clutch;
 (e) and a link connecting said crank shaft to said operating lever for oscillating said crank shaft thereby to advance said worm shaft when the movement of said drive shaft exceeds the limits of said slot.

2. A slack adjuster, as defined in claim 1, wherein:
 (a) said clutch includes a clutch holder having a set of clutch roller recesses and said drive pin receiving slot; a set of rollers therein, and a bearing ring on said shaft engaged by said rollers to turn said shaft.

3. An automatic slack adjuster for brakes, comprising:
 (a) a lever structure interposed between a brake shaft and an operating rod, and having a worm gear bore, a worm cavity and a worm shaft bore;
 (b) a worm gear in said worm gear bore connected to said brake shaft;
 (c) a worm in said form cavity engageable with said worm gear;
 (d) a shaft for said worm shaft bore, said lever structure having a counterbore at one end of said worm shaft bore;
 (e) a rotatable disk covering said counterbore;
 (f) a crank shaft secured in said disk and including a drive pin extending into said counterbore;
 (g) a link connecting said crank shaft to said operating arm;
 (h) and an overriding clutch interconnecting said drive pin and worm shaft to advance said worm gear and brake shaft upon predetermined movement of said crank shaft and drive pin.

4. An automatic slack adjuster, as defined in claim 3, wherein:
 (a) said clutch includes a holder journalled in said counterbore and having a set of clutch roller recesses and a drive pin slot receiving said drive pin and dimensioned to permit predetermined relative free movement of said drive pin, and a set of clutch rollers for said recesses operable to advance said worm shaft relative to said lever structure.

5. An automatic slack adjuster, as defined in claim 3, wherein:
 (a) said holder has a uniform cross section throughout its length, whereby said holder may be placed either axial end first in said counterbore, thereby to permit driving of said worm shaft in either selected direction.

6. An automatic slack adjuster, as defined in claim 3, wherein:
 (a) said disk is provided with a stem having an annular groove;
 (b) said worm shaft is provided with a socket to receive said stem;
 (c) and a retainer pin restrained by the wall of said worm shaft bore locks said disk against axial displacement relative to said worm shaft.

7. An automatic slack adjuster, as defined in claim 3, wherein:
 (a) one end of said worm shaft protrudes from said worm shaft bore and is equipped with tool receiving means to rotate said worm shaft.

References Cited

UNITED STATES PATENTS 1,860,770   5/1932   Bugatti _____ 188—79.5
2,920,724   1/1960   Margetic et al. _____ 188—196
3,428,154   2/1969   Lodjic et al. _____ 188—196

DUANE A. REGER, Primary Examiner

U.S. Cl. X.R.

188—79.5